(12) United States Patent
Richey, Sr.

(10) Patent No.: US 9,586,337 B2
(45) Date of Patent: Mar. 7, 2017

(54) METHOD OF MANUFACTURING DOUBLE REEDS

(71) Applicant: William L Richey, Sr., Concord, NC (US)

(72) Inventor: William L Richey, Sr., Concord, NC (US)

(*) Notice: Subject to any disclaimer, the term of this patent is extended or adjusted under 35 U.S.C. 154(b) by 380 days.

(21) Appl. No.: 14/281,808

(22) Filed: May 19, 2014

(65) Prior Publication Data

US 2015/0328797 A1    Nov. 19, 2015

(51) Int. Cl.
*B27J 1/00*    (2006.01)
*G05B 19/414*    (2006.01)
*G10D 9/02*    (2006.01)

(52) U.S. Cl.
CPC ............ *B27J 1/00* (2013.01); *G05B 19/4145* (2013.01)

(58) Field of Classification Search
CPC ................................................ G05B 19/4145
USPC ......................................................... 700/160
See application file for complete search history.

(56) References Cited

U.S. PATENT DOCUMENTS

| 4,938,157 | A | * | 7/1990 | Scholl | .................... | D05B 65/06 112/287 |
| 5,248,924 | A | * | 9/1993 | Niwa | .................... | G05B 19/408 318/569 |
| 7,969,111 | B2 | * | 6/2011 | Otsuki | ................. | G05B 19/404 318/568.12 |
| 2009/0301284 | A1 | * | 12/2009 | Legere | ................... | G10D 9/023 84/383 A |
| 2011/0180182 | A1 | * | 7/2011 | James | ........................ | B27J 1/00 144/2.1 |
| 2013/0150994 | A1 | * | 6/2013 | Barbir | ................ | G05B 19/4099 700/98 |

\* cited by examiner

*Primary Examiner* — Robert Fennema
*Assistant Examiner* — Jigneshkumar Patel

(57) ABSTRACT

A computerized reed fabrication system having an X-Y-Z axes computer numerical controlled (CNC) machine capable of holding a tool bit. The CNC machine operates under the control of CNC software commands. The reed fabrication system further includes a tool bit held by the CNC machine and a reed holder located adjacent that tool bit. Non-transitory computer readable media stores CNC software commands. A computer reads those stored CNC software commands and sends them to the CNC machine. The CNC software commands cause the CNC machine to move the tool bit relative to the reed holder as required to fabricate a double reed from a cut piece of reed cane.

18 Claims, 4 Drawing Sheets

METHOD OF MANUFACTURING DOUBLE REEDS

FIELD OF THE INVENTION

The presently disclosed subject matter is directed to woodwind instrument reeds. More particularly, the present invention relates to a novel method of manufacturing double reeds for use in woodwind instruments.

BACKGROUND OF THE INVENTION

Among the many different types of musical instruments are wind instruments. In general, wind instruments are musical instruments having resonators that set air into vibration when an instrument player blows air across or into a resonator. The resonator creates a pitch that depends on the configuration and dimensions of the resonator. In use the instrument player modifies the musical pitch using one or more of a wide range of playing techniques that modify the resonator or air vibration.

Wind instruments are of two basic types: brass and woodwind. Some woodwind instruments use reeds to help set air in the resonators into vibrations. Of such reeded woodwind instruments there are two basic types: single reed woodwind instruments and double reed woodwind instruments. Double reed woodwind instruments include, among others, the bassoon and its variations, the oboe and its variations, and the English horn and its variations. Other woodwind instruments such as the bagpipe come in both single reed and double reed versions.

Double reeds require careful fabrication to arrive at the desired sound profile. The process of making double reeds was first established in the mid-17th Century. Since then, except for a number of tooling changes, very similar processes are in use today as then. First cane tubes are harvested from a suitable cane. Those cane tubes are then split lengthwise into equal pieces, traditionally 3 pieces. Splitting is usually performed by a cane splitter such as the cane splitters available from FORRESTS MUSIC, 1849 University Ave., Berkeley, Calif. 94703 U.S.A.

The split cane pieces are then cut to the desired length (such as 75 mm) A typical cutting tool would be the Reeds and Stuff model UHBG guillotine. The cut cane pieces are then pre-gouged to a working thickness. Pre-gouging is a process wherein the cut cane pieces are roughly formed into the desired final shape. A typical machine for pre-gouging would be the Reeds and Stuff model UHBPGM pre-gouger. The pre-gouged cane pieces are then gouged to an accurately controlled thickness. A suitable machine for gouging would be the Reeds and Stuff model UHGMO.

The accurately gouged cane pieces are then shaped into a desired final shape. This typically requires two machines, a shaper tip handle such as the Reiger handle #RBSH, and a shaper tip, such as one of the set of Reiger tips #RBST. A shaper such as the Reiger #RBTPM could also be used. The cut and profiled pieces are set end to end to form the double reed. The ends are then cut such that the end tips are removed and the exterior is scrapped with a knife for smoothness and final sound tuning. An example of a scrapping knife is the Reiger #RBKNFF.

It should be understood that good quality tools for forming double reeds are expensive, easily costing thousands of dollars. In addition, the prior art process of making double reeds was subject to a significant amount of waste caused by human error and became tiring after making numerous double reeds.

A double reed is comprised of two pieces of *arundo donax* cane that vibrate against each other. Different double reed instruments use different styles of double reeds and different double reed styles produce different sounds. In fact, different *arundo donax* reed materials behave differently. Glotin cane tends to be a medium-soft cane having a rather paler color. It generally requires a slightly thicker finishing gouge to produce good sound. While Glotin reeds have an overall silky texture it does vary from piece to piece. Some cane tubes yield some harder pieces while others are softer and stringy. Glotin cane is generally thick-walled with tight vascular bundles which can be very appealing. Finished Glotin reeds have a focused, rich sound, but because it a rather soft cane reeds longevity is not particularly good.

In contrast to Glotin, Rigotti is the 'work-horse' of the cane world. It is a medium walled cane having a generally golden color and moderate vascular bundles. Rigotti is quite easy to work with, which enables prepping and gouging Rigotti to the finished contours without adjusting the final gouge. Finished Rigotti double reeds produce a focused, full sound and have a good life-span.

Another reed material is Medir. Most Medir cane is grown and harvested in the Var region of France or from Spanish Catalonia. Medir is a medium strength cane with a darker golden color and some marbling. Medir is medium-walled with moderate vascular bundles and its tubes tend to be very straight and thus can yield a high number of processed pieces per given weight. Easy to work with, Medir finished reeds have a focused, rich sound, but are not quite as vibrant as Rigotti or Glotin.

Loree is probably the most popular and consistent double reed cane. A medium hard cane with a rich, golden color, light marbling, and smooth texture. Very consistent in terms of processing provides a high yield. Loree produces a very stable reed with a full, focused sound and with a rather long life span since it is a harder cane. The finished Loree gouge may need to be adjusted slightly to finish thinner in the center to facilitate vibrancy. While variable, Loree cane tends to have a high consistency in the final scrape and overall it is easy to work.

Pisoni cane is also a popular. Pisoni cane is generally a medium-hard to hard cane with a golden color, smooth and even texture, and some marbling and produces a high yield of finished pieces. Pisoni tubes are generally straight, and the final gouge may be adjusted to be slightly thinner to help vibrancy. Finished Pisoni double reeds tend to have a decent life span and to produce focused sound, albeit sometimes rather 'bright' depending on the scrape.

Var select cane is a medium-hard to hard cane with a rather pale color, a dull texture and tends to be somewhat tricky to work. Consistency varies but in general Var is a medium-walled cane with tight vascular bundles which can use a slightly thin final gouge to facilitate vibrancy. The resulting reeds usually have good longevity. Harder pieces have a much more focused sound that can be 'bright' whereas softer pieces are less focused and less stable.

Rieger cane is a medium-hard to hard cane, golden in color, thick-walled with some marbling. Rieger cane is generally very consistent with very straight tubes that produce a high yield of finished pieces. The final gouge may be adjusted to finish slightly on the thinner side to help facilitate vibrancy. Rieger cane generally requires more effort to get reeds vibrating, but reeds made of Rieger cane are usually very focused and sit up in pitch.

Alliaud is one of the hardest canes. Alliaud has a darker golden color, tight vascular bundles, very thick walls, some marbling and produces an even scrape. Alliaud require effort to get the reeds vibrating, but the resulting reeds have a long lifespan and are very focused and stable. Alliaud is usually very consistent between harvest dates. The yield is slightly low as some tubes tend to be twisty which results in fewer finished pieces per weight. Alliaud is particular well-suited for smaller diameter double reeds.

From the foregoing it can be seen that fabricating double reeds is time consuming and the required tooling can be expensive. Furthermore as can also be seen the various cane types require different tooling work and have different sound properties. Given those issues a new system for fabricating double reeds would be useful. Even more useful would be a new system for fabricating double reeds that take less time and that can be tightly controlled to produce useable reeds. Ideally such a system would be easy to adjust to work with different reeds, would work well with different types of reed materials, and which could be readily adjusted to produce customized double reeds. Beneficially such a system would reduce the human effort and drudgery of producing double reeds while also increasing yields.

BRIEF SUMMARY OF THE INVENTION

The principles of the present invention provide for a new system of fabricating double reeds that take less time and which can be tightly controlled to produce useable reeds. That system is easy to adjust to work with different reed materials to produce different contoured double reeds. That system can also be readily adjusted to produce customized double reeds. It also reduces human effort and drudgery while increasing yields.

A computerized reed fabrication system in accord with the present invention includes an X-Y-Z axes computer numerical controlled (CNC) machine capable of holding a tool bit. The X-Y-Z axes refer to a Cartesian coordinate system that uniquely specifics each point in 3 dimensional space using numerical coordinates which represent distances from an origin along each of three perpendicular reference lines. Each reference line is referred to as a coordinate axis.

The CNC machine operates under the control of CNC software commands. The reed fabrication system also includes a tool bit held by the CNC machine and a reed holder adjacent to that tool bit. Non-transitory computer readable media stores CNC software commands. A computer reads those stored CNC software commands and sends them to the CNC machine. The CNC software commands cause the CNC machine to move the tool bit relative to the reed holder as required to fabricate a reed.

The computerized reed fabrication system may also include a reed splitter for splitting a cane tube to produce a cane piece, a reed cutter for cutting a split cane piece to a desired length, and/or a pre-gouger for pre-gouging a cut cane piece. The CNC machine may also include a base plate for securing the reed holder in place. Beneficially, the computer includes a data entry device and a display for showing CNC software commands. Preferably the CNC software commands are G-codes. Ideally the CNC software commands cause the CNC machine to move the tool bit relative to the reed holder to fabricate a double reed.

In another aspect the present invention is a method of fabricating a reed by splitting a cane tube to produce a cane piece, cutting the cane piece to a desired length, inserting the cut cane pieced into a reed holder, downloading CNC software commands from a non-transitory computer readable memory, sending downloaded CNC software commands to an X-Y-Z axes CNC machine holding a tool bit, locating a reed holder relative to the tool bit, and tapering the cut cane piece in accord with the CNC software commands to produce a reed. Preferably that reed is a double reed and the CNC software commands are downloaded into a computer and then transferred into the CNC machine. Beneficially, the method produces a double reed for an oboe, for a bassoon, or for an English horn.

In another aspect the present invention takes the form of non-transitory computer readable media containing computer code to implement a computerized reed fabrication system having a CNC machine to produce a double reed. That double reed can be for an oboe, a bassoon, or for an English horn.

BRIEF DESCRIPTION OF THE DRAWINGS

The advantages and features of the present invention will become better understood with reference to the following detailed description and claims when taken in conjunction with the accompanying drawings, in which:

DETAILED DESCRIPTION OF THE INVENTION

Figure 1:
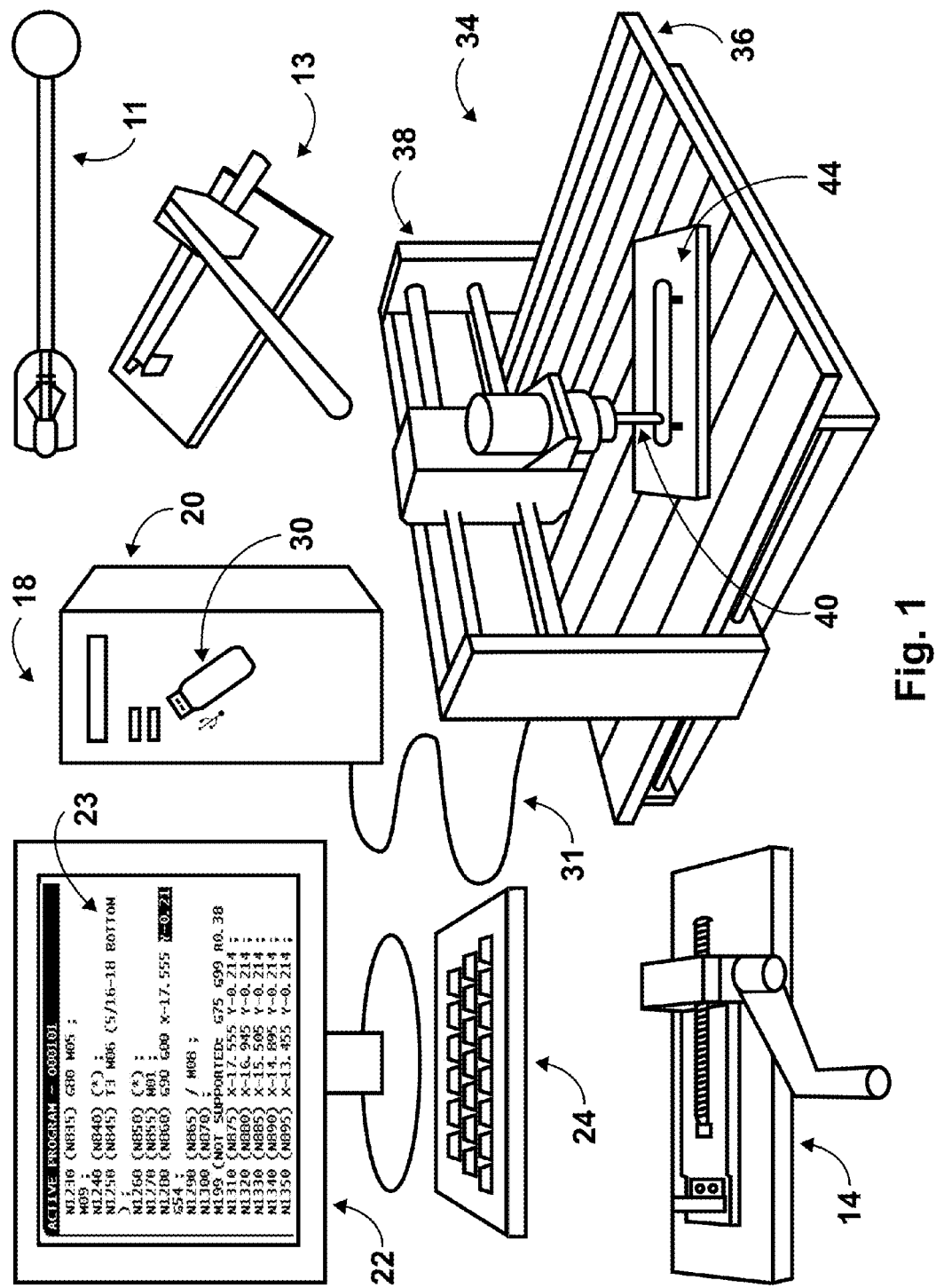
FIG. 1 illustrates a reed fabrication system 10 that is in accord with a preferred embodiment of the invention.
Figure 2:
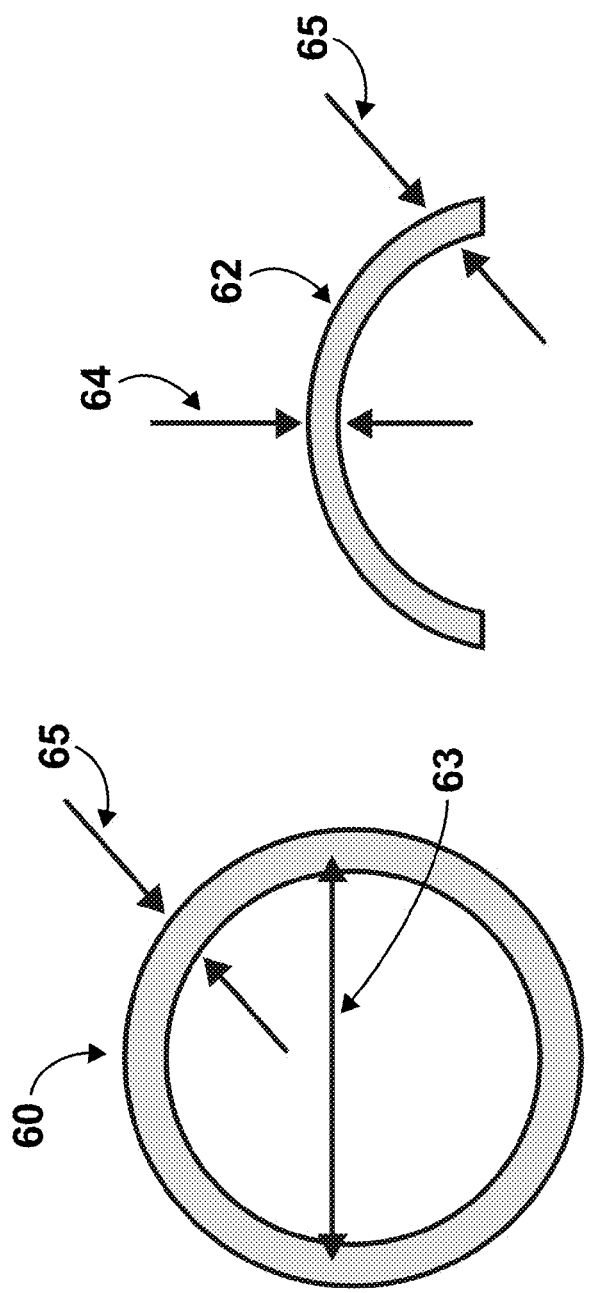
FIG. 2 illustrates a front-on view of a cane tube before splitting and after fabrication.
Figure 3:
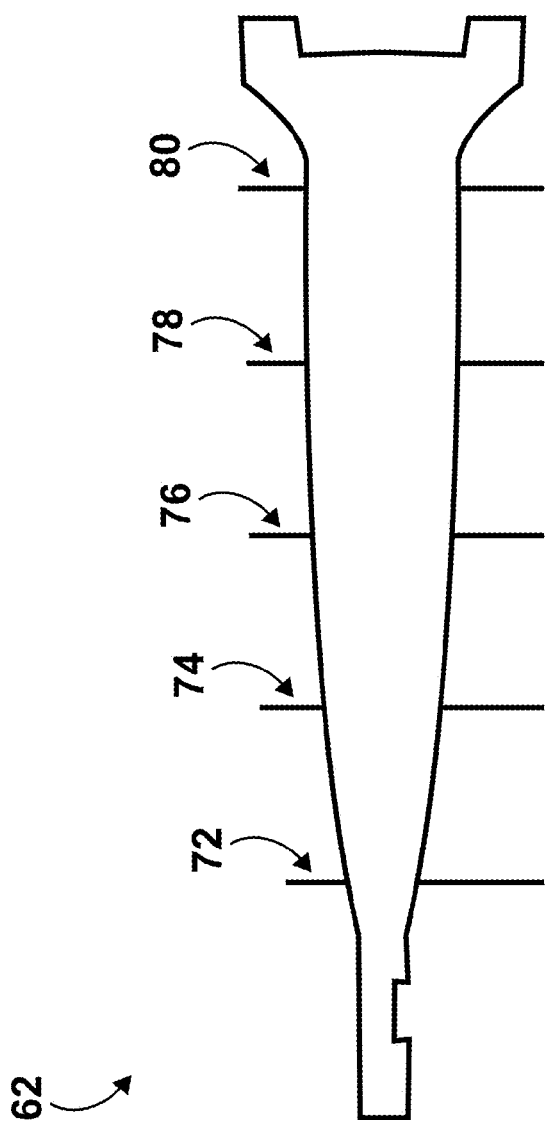
FIG. 3 illustrates a top-down view of a reed before final cutting.
Figure 4:
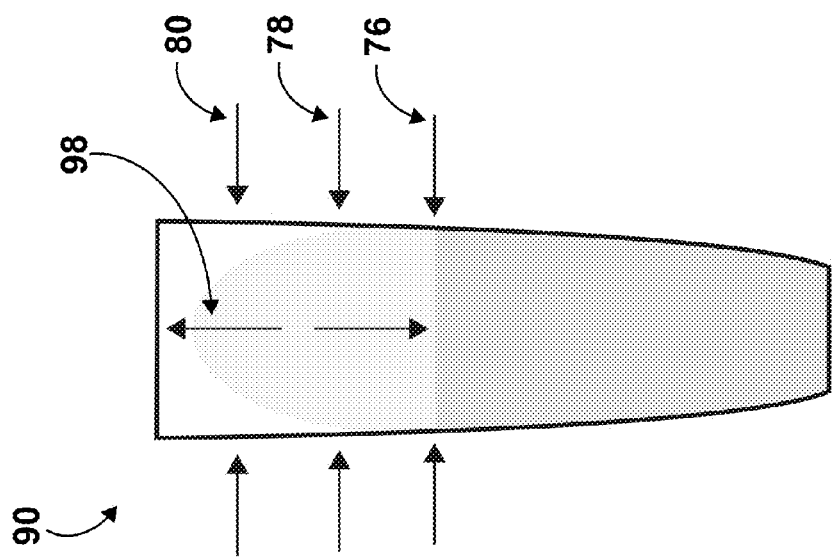
FIG. 4 illustrates a top-down view of a finished reed.

The preferred embodiment of the present invention is a reed fabrication system 10 which is depicted in FIG. 1. FIGS. 2-4 illustrate reed contours of reeds which are used in or result from the operations of the reed fabrication system 10. However, the present invention is not limited to the specifically described embodiment. A person skilled in the applicable art will appreciate that many other embodiments of the invention are possible without deviating from the basic concept of the invention. All such work-arounds fall within the scope of this invention.

In the figures like numbers refer to like elements throughout. Additionally, the terms "a" and "an" as used herein do not denote a limitation of quantity, but rather denote the presence of at least one of the referenced items. Unless otherwise specified all directional signals such as up, down, left, right and over and under are taken relative to FIG. 1.

As referred to herein, a "computer" is any processor-operated device or group of processor-based devices having memory suitable for receiving code from non-transitory computer readable media for implementing the subsequently disclosed reed fabrication system 10 for producing reeds.

FIG. 1 illustrates the reed fabrication system 10. The reed fabrication system 10 includes is a computerized system that operates in accord with non-transitory software stored on a non-transitory computer readable media 30. The software includes programmable code which implements communications between a computer system 18 and a CNC machine 34. That software includes G-code commands 23 which control the X-Y-Z motions of a tool bit 40 of the CNC machine 34. G-code 23 commands are shown on a display 22 of the computer system 18. The G-Code 23 can be edited by an operator via an input device 24 such as a keyboard. The main computer 20 contains the computer processor.

The G-code 23 is downloaded to the CNC machine 34 by a wired or wireless link 31. The link 31 should be understood as being any of a number of different communication venues such as serial port communications, parallel port communications, USB communications, optical or infra-red communications, radio communications, a hard wired telephone line, microwave, optical or any other technique that enables communication between the computer system 18 and the CNC machine 34. The link 31 also should be understood as including any towers, internet links, routers, phone lines, microwave towers, and/or other communication facilities needed to implement communications.

While the computer system 18 and the CNC machine 34 can produce a reed 62 (see FIGS. 2 and 3) directly from a cane tube 60 (see FIG. 2) such is not considered the best method of fabricating finished reeds 62. Loses are high, which makes yields low. Furthermore, numerous handling and reed manipulations as well as numerous tool bit 40 changes are required. To avoid those and other issues the preferred reed fabrication system 10 incorporates a manually-operated cane splitter 11, cane cutter 13 and pre-gouger 14 such as those described above.

The cane splitter 11 splits a raw cane tube 60 (see FIG. 2) into two or more pieces. The cane cutter 13 then cuts the split pieces to the desired length for CNC fabrication. The pre-gouger 14 then pre-gouges the cut pieces to produce a pre-gouged piece that is similar to the gouged piece 62 shown in FIG. 2. The gouged piece 62 is actually a cut piece that has been pre-gouged and subsequently milled by the CNC machine 34 as explained in more detail subsequently. Pre-gouging reduces material removal requirements and generally saves wear on the tool bit 40.

FIG. 2 illustrates reed fabrication results. A cane tube 60 is procured. It has an inner diameter 63 and a wall thickness 65. The cane tube 60 is split (shown as being split in half, but traditionally three pieces is formed) and then cut to length. The split cane is pre-gouged and then CNC milled (gouged) to produce a tapering wall that varies from a maximum thickness 65 to a minimum thickness 64. However, it should not be assumed that the gouged piece 62 necessarily has a uniform taper.

The reed fabrication system 10 is very beneficial is converting the pre-gouged split cane tube 60 into the milled (gouged) piece 62. Tapering and thicknesses can be controlled by G-code 23. Repeatability is excellent, human labor is greatly reduced; fabrication speed is increased while boredom is decreased.

Referring back to FIG. 1, to fabricate the gouged piece 62 a piece of pre-gouged split cane tube 60 is inserted into a reed holder 44 and then accurately positioned relative to the tool bit 40 on the base plate 36 of the CNC machine 34. The operating software and G-codes 23 are then downloaded from the computer readable media 30 into the computer system 18. The computer system 18 then sends G-code 23 commands to the CNC machine 34 via the link 31. The CNC machine 34 then moves the rotating tool bit 40 relative to the pre-gouged piece in the reed holder 44 using the X-Y-Z axis controller 38 to produce the gouged piece 62.

Referring now to FIG. 2, the minimum thickness 64 of the gouged piece 62 is set by G-code 23. Typical values of the minimum thickness 64 are between 0.55-0.57 mm and 0.67-0.69 mm, depending on the type of reed being produced. Oboes will be different than bassoons, and different types of oboes and different types of bassoons will have different thicknesses. The maximum thickness 65 can be controlled either by the CNC machine 34 or by proper selection of the appropriate cane tube 60.

FIG. 3 shows the axial tapering of the gouged piece 62. That tapering is controlled by G-codes 23 to produce a desired profile that depends on the type of double reed being produced. For example, an oboe reed made from Rigotti-1N may have a dimension 72 of 3.2 mm, a dimension 74 of 4.8 mm, a dimension 76 of 5.8 mm, a dimension 78 of 6.5 mm and a dimension 80 of 6.9 mm. As another example, an English horn double reed made from Rigotti-1 may have a dimension 72 of 3.6 mm, a dimension 74 of 5.9 mm, a dimension 76 of 7.0 mm, a dimension 78 of 7.7 mm and a dimension 80 of 8.3 mm.

Significantly, the CNC machine 34 can be set up to produce the foregoing dimensions simply by switching G-codes 23. Such G-codes are readily stored in the non-transitory computer readable media 30. To produce the G-code 23 itself the desired tip profiles may be drawn in a CAD program and then saved in a suitable file format such as the DXF file format. That file format can then be converted into G-codes 23.

Turning now to FIG. 4, the gouged piece 62 (see FIG. 3) is then cut to form a tip 90. The dimensions 76 through 80 of the tip 90 are shown. The tip 90 may be manually scrapped with a scraping knife to fine tune the sound. The tip 90 has a tapering profile along its axial length of the tip 90.

The foregoing descriptions of the specific embodiment of the present invention have been presented for purposes of illustration and description. They are not intended to be exhaustive or to limit the invention to the precise forms disclosed. Many modifications and variations are possible in light of the above teaching. The specific embodiment was chosen and described in order to best explain the principles of the invention and its practical application. This enables others skilled in the art to best utilize the invention and it various modifications as are suited to the particular use contemplated.

What is claimed:

1. A computerized double reed fabrication system, comprising:
    an X-Y-Z axes computer numerical controlled (CNC) machine capable of holding a tool bit, said CNC machine for controlling said tool bit as directed by CNC software commands;
    a tool bit held by said CNC machine;
    a holder for prefabricating canes for a double-reed adjacent to said tool bit for holding a partially fabricated double reed;
    non-transitory computer readable media storing CNC software commands for fabricating a finished double reed from a partially fabricated double reed held in said holder; and
    a computer for reading said stored CNC software commands, said computer further for sending said read CNC software commands to said CNC machine;
    wherein said CNC software commands cause said CNC machine to move said tool bit relative to said holder so as to finish fabricating a double reed.

2. The computerized double reed fabrication system according to claim 1, further including a reed splitter for splitting a cane tube to produce a split cane piece.

3. The computerized double reed fabrication system according to claim 2, further including a reed cutter for cutting a split cane piece to a desired length.

4. The computerized double reed fabrication system according to claim 3, further including a pre-gouger for pre-gouging a cut cane piece to produced a partially fabricated cane for making a double reed.

5. The computerized double reed fabrication system according to claim 1, wherein said CNC machine further includes a base plate securing said holder in place.

6. The computerized double reed fabrication system according to claim 1, wherein said computer includes a data entry device.

7. The computerized double reed fabrication system according to claim 6, wherein said computer further includes a display for showing said CNC software commands.

8. The computerized double reed fabrication system according to claim 1, wherein said CNC software commands are G-codes.

9. A method of fabricating a double reed comprising the steps of:
   splitting a cane tube to produce a cane piece;
   cutting the cane piece to a desired length;
   inserting the cut cane pieced into a holder;
   downloading CNC software commands from a non-transitory computer readable memory;
   sending downloaded CNC software commands to an X-Y-Z axes CNC machine holding a tool bit;
   locating the holder relative to the tool bit; and
   tapering the cut cane piece in accord with the CNC software commands to produce a double reed.

10. The method of fabricating a double reed according to claim 9, wherein downloading CNC software commands is performed by downloading into a computer.

11. The method of fabricating a double reed according to claim 10, wherein sending downloaded CNC software commands is performed by transferring CNC software commands from the computer into the CNC machine.

12. The method of fabricating a double reed according to claim 11, wherein the step of tapering the cut cane piece produces a double reed for an oboe.

13. The method of fabricating a double reed according to claim 11, wherein the step of tapering the cut cane piece produces a double reed for a bassoon.

14. The method of fabricating a double reed according to claim 11, wherein the step of tapering the cut cane piece produces a double reed for an English horn.

15. Non-transitory computer readable media containing computer code to implement a computerized reed fabrication system having a computer system and a CNC machine to produce a double reed.

16. The non-transitory computer readable media according to claim 15, wherein the computer code produces a double reed for an oboe.

17. The non-transitory computer readable media according to claim 15, wherein the computer code produces a double reed for a bassoon.

18. The non-transitory computer readable media according to claim 15, wherein the computer code produces a double reed for an English horn.

* * * * *